United States Patent
Geng et al.

(10) Patent No.: US 12,328,667 B2
(45) Date of Patent: Jun. 10, 2025

(54) COMMUNICATION METHOD AND APPARATUS

(71) Applicant: Huawei Technologies Co., Ltd., Shenzhen (CN)

(72) Inventors: Tingting Geng, Shanghai (CN); Chunhua You, Shanghai (CN); Le Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 523 days.

(21) Appl. No.: 17/812,898

(22) Filed: Jul. 15, 2022

(65) Prior Publication Data

US 2022/0353767 A1     Nov. 3, 2022

Related U.S. Application Data

(63) Continuation of application No. PCT/CN2020/072856, filed on Jan. 17, 2020.

(51) Int. Cl.
*H04W 48/20* (2009.01)
*H04W 52/14* (2009.01)

(52) U.S. Cl.
CPC .......... *H04W 48/20* (2013.01); *H04W 52/146* (2013.01)

(58) Field of Classification Search
CPC ..... H04W 36/08; H04W 36/04; H04W 36/34; H04W 36/10
See application file for complete search history.

(56) References Cited

U.S. PATENT DOCUMENTS

| | | | |
|---|---|---|---|
| 9,497,681 B2* | 11/2016 | Dimou | H04W 36/20 |
| 2013/0223235 A1* | 8/2013 | Hu | H04W 36/04 |
| | | | 370/242 |
| 2017/0223732 A1 | 8/2017 | Bertrand et al. | |
| 2019/0394690 A1 | 12/2019 | Shih et al. | |
| 2019/0394691 A1* | 12/2019 | Shih | H04W 48/20 |

FOREIGN PATENT DOCUMENTS

| | | |
|---|---|---|
| CN | 1726660 A | 1/2006 |
| CN | 103718612 A | 4/2014 |
| CN | 105007606 A | 10/2015 |
| CN | 105144804 A | 12/2015 |
| CN | 109151968 A | 1/2019 |
| CN | 109802733 A | 5/2019 |
| CN | 109842926 A | 6/2019 |

(Continued)

OTHER PUBLICATIONS

Interdigital Inc: "SUL Impact on Cell Selection and Reselection Criteria", 3GPP TSG-RAN WG2 NR #101-Bis, R2-1804813, Apr. 16-Apr. 20, 2018, 3 Pages, Sanya, China.

(Continued)

*Primary Examiner* — Tu X Nguyen
(74) *Attorney, Agent, or Firm* — Slater Matsil, LLP

(57) ABSTRACT

This application relates to the field of communication technologies, and discloses a communication method and apparatus. The terminal device determines, depending on a second information from a network device and whether a terminal device supports uplink service transmission through a second network device, a parameter used to perform cell selection or cell reselection.

18 Claims, 10 Drawing Sheets

(56) References Cited

FOREIGN PATENT DOCUMENTS

EP         3709710 A1    9/2020
WO      2019096020 A1    5/2019

OTHER PUBLICATIONS

Huawei et al., "Cell Reselection for SUL Cell", 3GPP TSG-RAN WG2 # AH1807, R2-1810135, Jul. 2-6, 2018, 3 Pages, Montreal, Canada.
Huawei et al., "WF on pathloss offset of SUL for LTE-NR UL coexistence", 3GPP TSG RAN WG1 meeting #90, R1-1714835, Prague, Czech Republic, Aug. 21-25, 2017, 4 pages.
CATT, "Uplink power control discussions for CoMP", 3GPP TSG RAN WG1 Meeting #67, R1-113736, San Francisco, CA, US, Nov. 14-18, 2011, 5 pages.

* cited by examiner

COMMUNICATION METHOD AND APPARATUS

CROSS-REFERENCE TO RELATED APPLICATIONS

This application is a continuation of International Application No. PCT/CN2020/072856, filed on Jan. 17, 2020, the disclosure of which is hereby incorporated by reference in its entirety.

TECHNICAL FIELD

This application relates to the field of communication technologies, and in particular, to a communication method and apparatus.

BACKGROUND

When a new radio (NR) cell is deployed, it is considered that transmit power of a network device is higher than transmit power of a terminal device, and there is a scenario in which uplink (UL) coverage of the cell is less than downlink (DL) coverage of the cell. Therefore, in an R17 standard phase, it is discussed that a node with an amplification function is introduced to enhance coverage of NR. In a possible manner, an uplink relay node is deployed, and the network device and the uplink relay node jointly implement uplink coverage, so that uplink coverage and downlink coverage of NR are balanced. As shown in FIG. 1, an uplink relay node supports only uplink service (data, a signal, or the like) transmission of a terminal device, for example, receiving of an uplink service of the terminal device and forwarding of the uplink service to a network device. In this deployment architecture, uplink coverage is jointly provided by the network device and the uplink relay node. An uplink frequency of the network device and an uplink frequency of the uplink relay node are the same, and one cell has one downlink frequency and one uplink frequency. This can avoid a problem that an uplink frequency is additionally set to balance uplink coverage and downlink coverage, for example, a supplementary uplink (SUL) frequency is additionally set, and the network device and the terminal device need to additionally support SUL. In this way, network deployment costs can be effectively reduced.

However, when a cell in which the uplink relay node is deployed is accessed, uplink and downlink of the terminal device may be separated. FIG. 1 is still used as an example. When the terminal device is located in a peripheral area of a downlink coverage area of the network device, an uplink service of the terminal device is forwarded to the network device through the uplink relay node, and a downlink service of the terminal device is still sent by the network device to the terminal device. If the terminal device directly performs uplink scheduling still based on downlink quality, a problem, for example, uplink transmit power of the terminal device being excessively high occurs, causing interference to other uplink service transmission.

SUMMARY

This application provides a communication method and apparatus, to resolve a problem of how a terminal device determines uplink transmit power if an uplink service of the terminal device is forwarded to a network device through a relay node when the uplink relay node is introduced to enhance uplink coverage, to avoid interference to other uplink service transmission.

According to a first aspect, this application provides a communication method. The method includes: receiving first information from a first network device, where the first information includes a quality threshold and a pathloss delta; obtaining downlink quality and a downlink pathloss of a first path; and determining uplink transmit power of a second path based on the downlink pathloss and the pathloss delta when determining that the downlink quality is lower than the quality threshold, where the second path is a communication path between a terminal device and a second network device.

In this application, the first network device may support uplink service transmission and downlink service transmission of the terminal device, and may support processing on an uplink service and a downlink service of the terminal device. In an example, the first network device may be a device such as a base station that communicates with the terminal device through one or more cells in an NR system. The second network device supports only uplink service transmission of the terminal device, for example, supports only receiving of an uplink service of the terminal device, and forwarding of the received uplink service to the first network device. In an example, the second network device may be an uplink relay node.

The communication method described in this application may be implemented by the terminal device, or may be implemented by a component such as a processing chip or a circuit in the terminal device. According to the foregoing method, when the obtained downlink quality is less than the quality threshold, the terminal device determines that the terminal device is located in an uplink coverage area of the second network device. The terminal device may accurately determine, based on the quality threshold, whether the terminal device is located in an uplink coverage area of the first network device or in the uplink coverage area of the second network device, and may correct a pathloss of a communication path between the terminal device and the first network device based on the pathloss delta, to obtain a pathloss of the communication path between the terminal device and the second network device, and accurately determine the uplink transmit power of the communication path between the terminal device and the second network device. In this way, a problem, for example, uplink transmit power of the terminal device being excessively high is avoided, so that interference to other uplink service transmission is avoided.

In a possible design, if the first information further includes second receive target power corresponding to the second network device, the determining uplink transmit power of a second path based on the downlink pathloss and the pathloss delta includes: determining the uplink transmit power of the second path based on the downlink pathloss, the pathloss delta, and the second receive target power.

In the foregoing design, the first network device may further indicate the second receive target power corresponding to the second network device. This helps the terminal device accurately determine the uplink transmit power of the communication path between the terminal device and the second network device. In this way, a problem, for example, the uplink transmit power of the terminal device being excessively high is avoided.

In a possible design, a target power ramping step is determined based on a quantity of random access retransmission times and a second power ramping step corresponding to the second network device; and the uplink transmit power is adjusted based on the target power ramping step.

In the foregoing design, when the terminal device is located in the uplink coverage area of the second network device, after random access fails, the terminal device adjusts the uplink transmit power of the communication path between the terminal device and the second network device based on the quantity of random access retransmission times and the second power ramping step corresponding to the second network device. This helps accurately control the uplink transmit power of the communication path between the terminal device and the second network device. In this way, a problem, for example, the uplink transmit power of the terminal device being excessively high is avoided.

In a possible design, a timing advance TA corresponding to the second network device is determined.

In the foregoing design, there is a difference between a distance between the first network device and the terminal device and a distance between the second network device and the terminal device. Consequently, there is a difference between a TA that is of the terminal device and that is corresponding to the first network device and the TA that is of the terminal device and that is corresponding to the second network device. The terminal device may correct the TA corresponding to the first network device based on a timing advance delta, to obtain the TA corresponding to the second network device. In this way, that interference occurs between different uplink service transmission of the terminal device, and affects receiving of an uplink service of the terminal device by the network device is avoided.

According to a second aspect, this application provides a communication method.

The method includes: receiving second information from a first network device, where the second information includes a first parameter and a second parameter that are for a first cell, the first parameter is used by a first terminal device to perform cell selection or cell reselection, the second parameter is used by a second terminal device to perform cell selection or cell reselection, the first terminal device is a terminal device that supports uplink service transmission through the first network device and a second network device, and the second terminal device is a terminal device that supports uplink service transmission only through the first network device; and determining, depending on the second information and whether a terminal device supports uplink service transmission through the second network device, a parameter used to perform cell selection or cell reselection.

The communication method described in this application may be implemented by the terminal device, or may be implemented by a component such as a processing chip or a circuit in the terminal device. According to the foregoing method, when a cell is a cell in which the second network device is deployed, the first network device sends the first parameter and the second parameter that are for the first cell to the terminal device, so that the terminal device that supports uplink service transmission through the first network device and the second network device performs cell selection or cell reselection, and the terminal device that supports uplink service transmission only through the first network device performs cell selection or cell reselection. This avoids a problem that cell reselection is performed too early or too late because only the second parameter is sent, where the second parameter is correspondingly used for performing cell selection or cell reselection by the terminal device that supports uplink service transmission only through the first network device.

In a possible design, the first parameter is used to determine a minimum receive level required by the first cell to perform uplink service transmission on the first terminal device; and the second parameter is used to determine a minimum receive level required by the first cell to perform uplink service transmission on the second terminal device.

In the foregoing design, the minimum receive level required by the first cell to perform uplink service transmission on the first terminal device and the minimum receive level required by the first cell to perform uplink service transmission on the second terminal device may be indicated in an indirect indication manner.

In a possible design, the first parameter is used to indicate the minimum receive level required by the first cell to perform uplink service transmission on the first terminal device; and the second parameter is used to indicate the minimum receive level required by the first cell to perform uplink service transmission on the second terminal device.

In the foregoing design, the minimum receive level required by the first cell to perform uplink service transmission on the first terminal device and the minimum receive level required by the first cell to perform uplink service transmission on the second terminal device may be indicated in a direct indication manner.

In a possible design, the first cell is a serving cell or a neighboring cell of the terminal device.

In the foregoing design, when the serving cell or the neighboring cell is a cell in which the second network device is deployed, both the first network device and the second network device may send second indication information to the terminal device. This helps the terminal device perform, depending on whether the terminal device supports a capability of performing uplink service transmission through the first network device and the second network device, cell selection and cell reselection, to avoid a problem that cell reselection is performed too early or too late.

According to a third aspect, this application provides a communication method. The method includes: A first network device sends first information to a terminal device, where the first information includes a quality threshold and a pathloss delta.

The communication method described in this application may be implemented by the first network device, or may be implemented by a component such as a processing chip or a circuit in the first network device.

In a possible design, the first information further includes second receive target power corresponding to a second network device.

According to a fourth aspect, this application provides a communication method. The method includes: A first network device sends second information to a terminal device, where the second information includes a first parameter and a second parameter that are for a first cell, the first parameter is used by a first terminal device to perform cell selection or cell reselection, the second parameter is used by a second terminal device to perform cell selection or cell reselection, the first terminal device is a terminal device that supports uplink service transmission through the first network device and a second network device, and the second terminal device is a terminal device that supports uplink service transmission only through the first network device.

The communication method described in this application may be implemented by the first network device, or may be implemented by a component such as a processing chip or a circuit in the first network device.

In a possible design, the first parameter is used to determine a minimum receive level required by the first cell to perform uplink service transmission on the first terminal device; and the second parameter is used to determine a minimum receive level required by the first cell to perform uplink service transmission on the second terminal device.

In a possible design, the first parameter is used to indicate the minimum receive level required by the first cell to perform uplink service transmission on the first terminal device; and the second parameter is used to indicate the minimum receive level required by the first cell to perform uplink service transmission on the second terminal device.

In a possible design, the first cell is a serving cell or a neighboring cell of the terminal device.

According to a fifth aspect, an embodiment of this application provides a communication apparatus. The apparatus has a function of implementing the method according to any one of the first aspect or the possible designs of the first aspect, or a function of implementing the method according to any one of the second aspect or the possible designs of the second aspect. The function may be implemented by hardware, or may be implemented by hardware executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform the method according to any one of the first aspect or the possible designs of the first aspect, or perform the method according to any one of the second aspect or the possible designs of the second aspect.

In a possible design, the apparatus may be a terminal device.

According to a sixth aspect, an embodiment of this application provides a communication apparatus. The apparatus has a function of implementing the method according to any one of the third aspect or the possible designs of the third aspect, or a function of implementing the method according to any one of the fourth aspect or the possible designs of the fourth aspect. The function may be implemented by hardware, or may be implemented by hardware executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform the method according to any one of the third aspect or the possible designs of the third aspect, or perform the method according to any one of the fourth aspect or the possible designs of the fourth aspect.

In a possible design, the apparatus may be a network device.

According to a seventh aspect, an embodiment of this application provides a communication system. The communication system may include a terminal device and a network device. The terminal device may be configured to: perform the method according to any one of the first aspect or the possible designs of the first aspect, or perform the method according to any one of the second aspect or the possible designs of the second aspect. The network device may be configured to: perform the method according to any one of the third aspect or the possible designs of the third aspect, or perform the method according to any one of the fourth aspect or the possible designs of the fourth aspect.

According to an eighth aspect, an embodiment of this application provides a computer-readable storage medium. The storage medium stores computer instructions. When the computer instructions are executed, the method according to any one of the first aspect or the possible designs of the first aspect may be implemented, the method according to any one of the second aspect or the possible designs of the second aspect may be implemented, the method according to any one of the third aspect or the possible designs of the third aspect may be implemented, or the method according to any one of the fourth aspect or the possible designs of the fourth aspect may be implemented.

According to a ninth aspect, an embodiment of this application further provides a computer program product, including a computer program or instructions. When the computer program or the instructions are executed, the method according to any one of the first aspect or the possible designs of the first aspect may be implemented, the method according to any one of the second aspect or the possible designs of the second aspect may be implemented, the method according to any one of the third aspect or the possible designs of the third aspect may be implemented, or the method according to any one of the fourth aspect or the possible designs of the fourth aspect may be implemented.

For technical effects that can be achieved in the third aspect to the ninth aspect, refer to the technical effects that can be achieved in the first aspect or the second aspect. Details are not described herein again.

DETAILED DESCRIPTION OF ILLUSTRATIVE EMBODIMENTS

Technical solutions in embodiments of this application may be applied to various communication systems, for example, may be applied to a communication system such as a 5th generation (5G) system, or may be applied to wireless fidelity (Wi-Fi), worldwide interoperability for microwave access (WIMAX), or a future communication system such as a future 6th generation (6G) system. 5G may also be referred to as new radio (NR).

Figure 2:
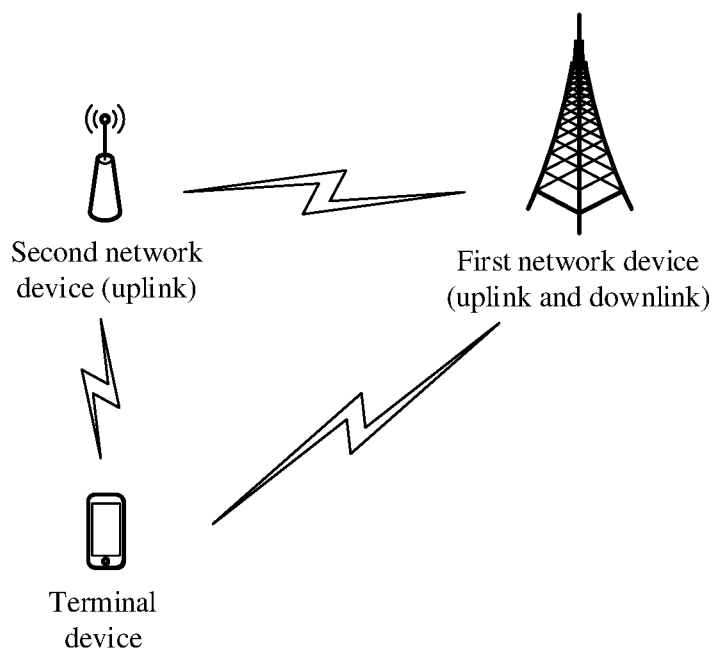
FIG. 2 is a schematic diagram of a communication architecture according to an embodiment of this application.

For example, an architecture of a communication system to which embodiments of this application are applied may be shown in FIG. 2, and the communication system includes a first network device, a second network device, and a terminal device. It should be noted that a quantity of first network devices, a quantity of second network devices, and a quantity of terminal devices in the communication system shown in FIG. 2 are not limited in embodiments of this application. The first network device may support uplink service transmission and downlink service transmission of the terminal device, and may support processing on an uplink service and a downlink service of the terminal device. The second network device supports only uplink service transmission of the terminal device, for example, supports only receiving of an uplink service of the terminal device, and forwarding of the received uplink service to the first network device. The terminal device may directly perform uplink service transmission and/or downlink service transmission with the first network device, or may perform uplink service transmission with the first network device through the second network device.

Before embodiments of this application are described, some terms of embodiments in this application are first described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capacity, or a device with a limited computing capability. For example, the terminal device includes an information sensor device such as a barcode, radio frequency identification (RFID), a sensor, a global positioning system (GPS), or a laser scanner.

By way of example and not limitation, in embodiments of this application, the terminal device may alternatively be a wearable device. The wearable device may also be referred to as a wearable intelligent device, an intelligent wearable device, or the like, and is a general term for wearable devices that are intelligently designed and developed for daily wear through a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. Generalized wearable intelligent devices include full-featured and large-sized devices that can implement all or some of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If located in a vehicle (for example, placed in the vehicle or installed in the vehicle), the various terminal devices described above may be all considered as vehicle-mounted terminal devices. For example, the vehicle-mounted terminal device is also referred to as an on-board unit (OBU).

In embodiments of this application, the terminal device may further include a relay. Alternatively, it may be understood that any device that can perform data communication with a base station may be considered as a terminal device.

In embodiments of this application, an apparatus configured to implement a function of a terminal device may be a terminal device, or may be an apparatus that can support the terminal device in implementing the function, for example, a chip system. The apparatus may be installed in the terminal device. In embodiments of this application, the chip system may include a chip, or may include a chip and another discrete device. In the technical solutions provided in embodiments of this application, the technical solutions provided in embodiments of this application are described through an example in which an apparatus configured to implement a function of a terminal is a terminal device.

(2) A first network device may be a device that is in an access network and that communicates with a wireless terminal device over an air interface through one or more cells. The first network device may be a node in a radio access network, and may also be referred to as a base station, or may be referred to as a radio access network (RAN) node (or device). Currently, for example, some first network devices are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In addition, in a network structure, the first network device may include a centralized unit (CU) node and/or a distributed unit (DU) node. The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer.

In embodiments of this application, an apparatus configured to implement a function of the first network device may be the first network device, or may be an apparatus that can support the first network device in implementing the function, for example, a chip system. The apparatus may be installed in the first network device. In the technical solutions provided in embodiments of this application, the technical solutions provided in embodiments of this application are described through an example in which an apparatus for implementing a function of the first network device is the first network device.

(3) A second network device may also be referred to as an uplink relay device (UL only), and may be a relay device that supports only uplink service transmission of a terminal device, for example, supports only receiving of an uplink service sent by the terminal device, and forwarding, to a relay device of a first network device, of the uplink service sent by the terminal device.

In embodiments of this application, an apparatus configured to implement a function of the second network device may be the second network device, or may be an apparatus that can support the second network device in implementing the function, for example, a chip system. The apparatus may be installed in the second network device. In the technical solutions provided in embodiments of this application, the technical solutions provided in embodiments of this application are described through an example in which an apparatus for implementing a function of the second network device is the second network device.

Figure 3:
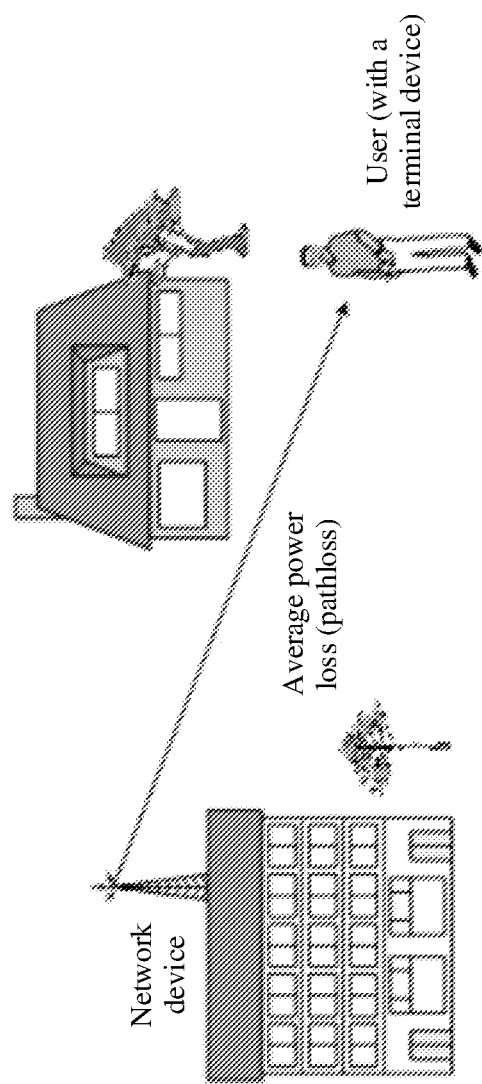
FIG. 3 is a schematic diagram of a pathloss according to an embodiment of this application.

(4) A pathloss is an average power loss of signals that is between a transmitter and a receiver and that is caused by a transmission distance and a transmission environment. The pathloss is closely related to the transmission distance, the transmission environment, and a carrier frequency. As shown in FIG. 3, a pathloss in a communication system may be simply understood as a power loss existing when a signal transmitted by a network device is transmitted to a location of a terminal device. For example, the pathloss is equal to a difference between transmit power of the network device or a cell and receive power measured by the terminal device.

(5) Uplink time adjustment (timing advance (TA) determining).

Figure 4A:
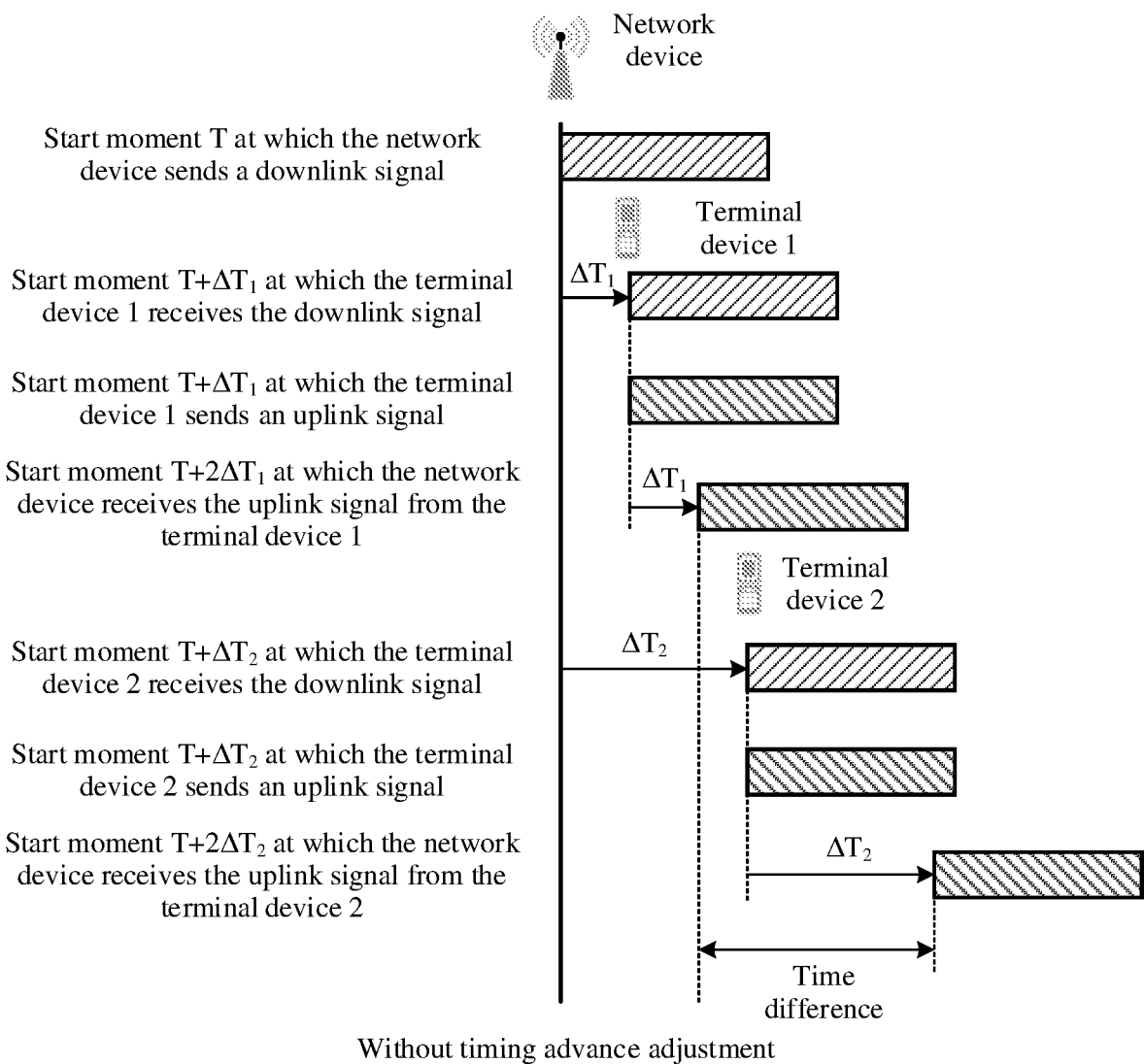
FIG. 4A and FIG. 4B each are a schematic diagram of uplink time adjustment according to an embodiment of this application.

As shown in FIG. 4A, because there is a delay in signal transmission between a network device and a terminal device, an interval between a start moment at which the network device sends a downlink signal and a start moment at which a terminal device 1 receives the downlink signal is $\Delta T_1 = d_1/c$, where $d_1$ is a distance between the network device and the terminal device 1, and c is a signal transmission speed. For wireless communication, c is the speed of light. Similarly, $\Delta T_2 = d_2/c$, where $d_2$ is a distance between the network device and a terminal device 2. If the terminal device 1 does not perform uplink timing adjustment, and sends an uplink signal to the network device through the start moment at which the terminal device 1 receives the downlink signal as a reference, an interval between a start moment at which the terminal device 1 sends the uplink signal and a start moment at which the network device receives the uplink signal is also $\Delta T_1$. Therefore, for the terminal device 1, there is a time advance of $2\Delta T_1$ between the start moment at which the network device sends the downlink signal and the start moment at which the network device receives the uplink signal. Similarly, for the terminal device 2, there is a time advance of $2\Delta T_2$ between the start moment at which the network device sends the downlink signal and the start moment at which the network device receives the uplink signal. Because distances between terminal devices and the network device are different, the uplink signal arrives at the network device at different time. Consequently, a time difference may exist between the terminal devices. However, when the time difference is greater than a cyclic prefix (CP) of an orthogonal frequency division multiplexing (OFDM) symbol, the terminal devices interfere with each other.

Figure 4B:
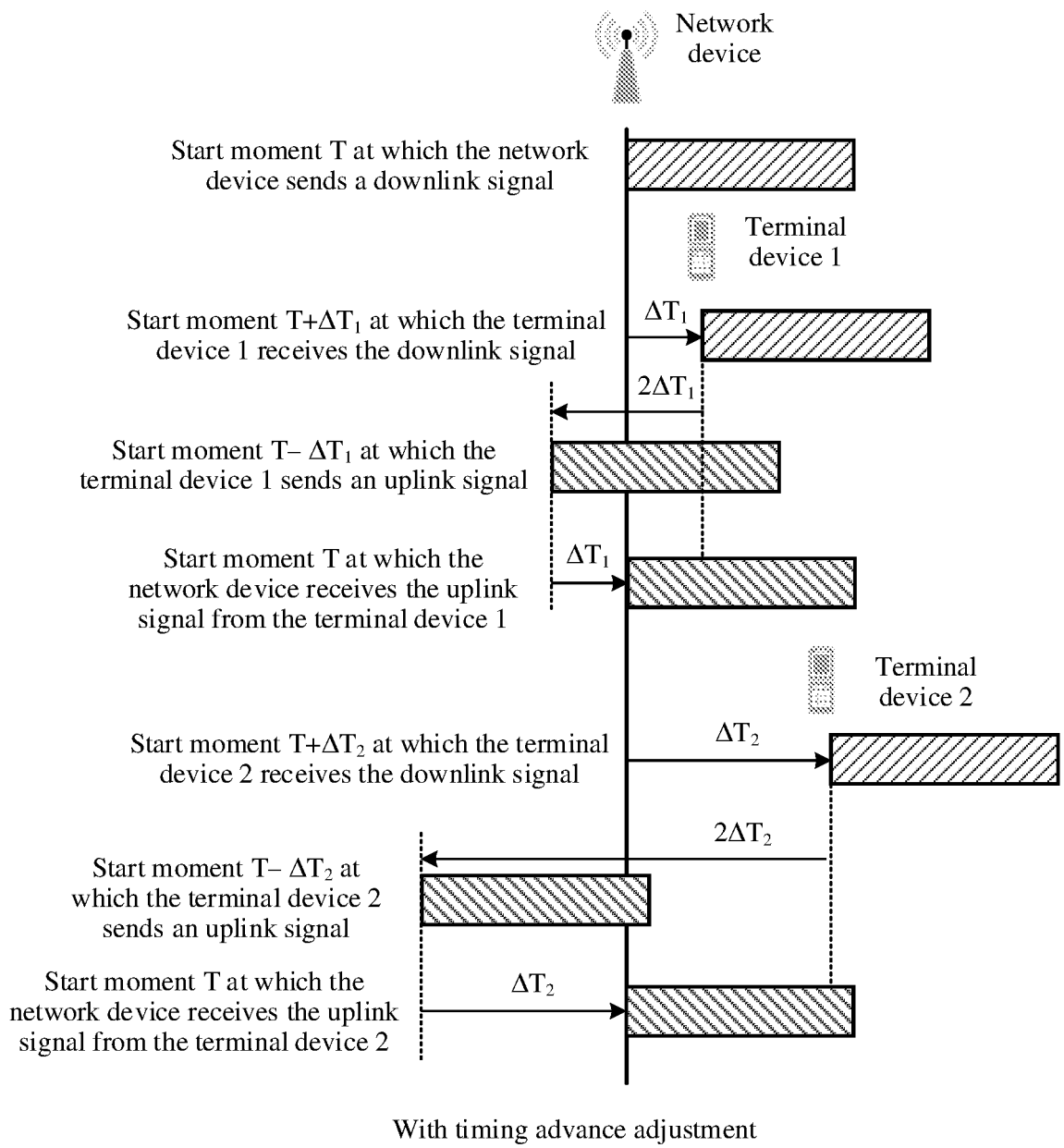

To resolve the problem of interference between the terminal devices, the terminal device needs to perform timing adjustment, which is also referred to as a timing advance, namely, a TA. As shown in FIG. 4B, a terminal device 1 advances a start moment for sending an uplink signal by $2\Delta T_1$, and a terminal device 2 advances a start moment for sending an uplink signal by $2\Delta T_2$. In this case, a network device receives the uplink signals of the terminal device 1 and the terminal device 2 at a same moment, so that a problem of mutual interference between terminal devices is resolved.

(6) Uplink transmit power determining may also be referred to as uplink power control, and is to enable a network device to receive an uplink service at appropriate receive power. The uplink service may be a service transmitted by a terminal device through an uplink physical channel. For example, the appropriate receive power means, on one hand, receive power required when the uplink service is correctly decoded by the network device, and on the other hand, that uplink transmit power of the uplink service cannot be unnecessarily high, to avoid interference to other uplink service transmission. To enable the network device to receive, at the appropriate receive power, the uplink service sent by the terminal device through the uplink physical channel, during uplink transmit power determining, uplink transmit power used when the terminal device sends the uplink service is mainly controlled. Optionally, for a channel, uplink transmit power required by the channel is related to attenuation (for example, a pathloss) experienced by the channel, interference and a noise level at a receive end, and the like. Therefore, a correct pathloss plays an important role in determining the uplink transmit power.

Figure 1:
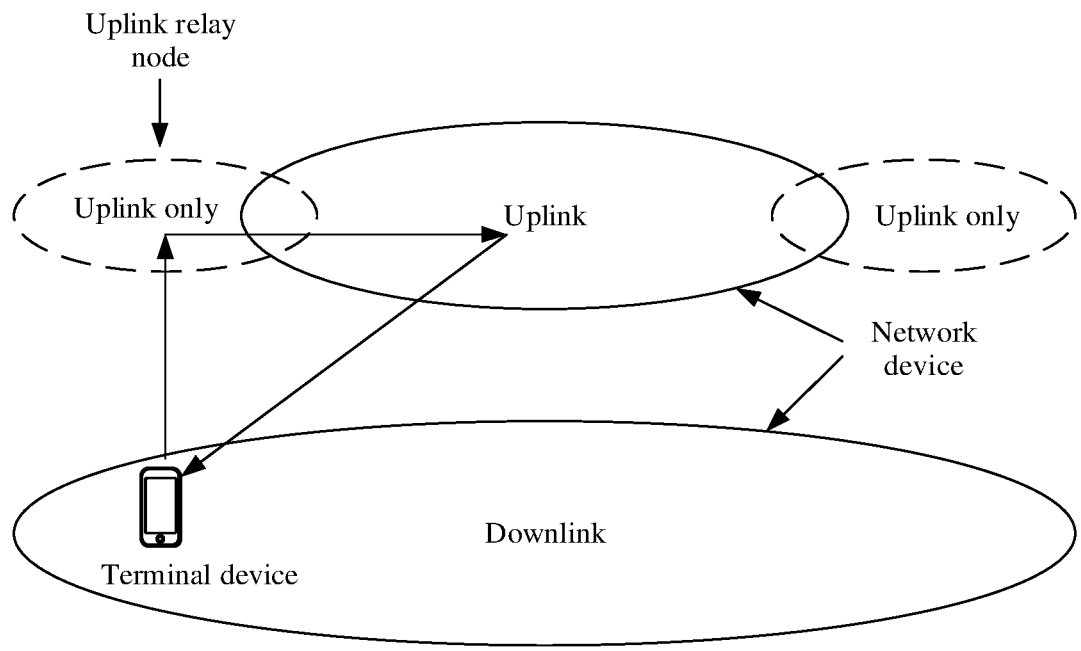
FIG. 1 is a schematic diagram of enhancing uplink coverage by an uplink relay node according to this application.

As shown in FIG. 1 and FIG. 2, with deployment of a second network device (for example, an uplink relay node) that supports only receiving of an uplink service of a terminal device, uplink coverage is provided by both a first network device and the second network device instead of being provided by only the first network device (for example, a base station that communicates with the terminal device through one or more cells in an NR system) that supports only uplink service transmission and downlink service transmission of the terminal device. How does the terminal device identify whether the terminal device is located in an uplink coverage area of the first network device or an uplink coverage area of the second network device and how does the terminal device determine uplink transmit power when the terminal device is located in the uplink coverage area of the second network device, to avoid interference to another uplink service transmission, become urgent problems to be resolved. Embodiments of this application intend to resolve the foregoing problems.

The following describes in detail embodiments of this application with reference to the accompanying drawings. In addition, it should be understood that in embodiments of this application, "at least one" may also be described as "one or more", and "a plurality of" may be two, three, four, or more. This is not limited in this application.

In embodiments of this application, "/" may represent an "or" relationship between associated objects, for example, A/B may represent A or B; "and/or" may be used to describe three relationships between the associated objects, for example, A and/or B may represent the following three cases: only A exists, both A and B exist, and only B exists. A and B may be singular or plural. For ease of describing the technical solutions in embodiments of this application, in embodiments of this application, words such as "first" and "second" may be used to distinguish between technical features having same or similar functions. The words such as "first" and "second" do not limit a quantity and an execution sequence, and the words such as "first" and "second" do not indicate a definite difference. In embodiments of this application, words such as "example" or "for example" are used to represent giving an example, an illustration, or a description. Any embodiment or design scheme described as "example" or "for example" should not be explained as being more preferred or advantageous over other embodiments or designs. Exactly, use of the words such as "example" or "for example" is intended to present a related concept in a specific manner for ease of understanding.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Embodiment 1

Figure 5:
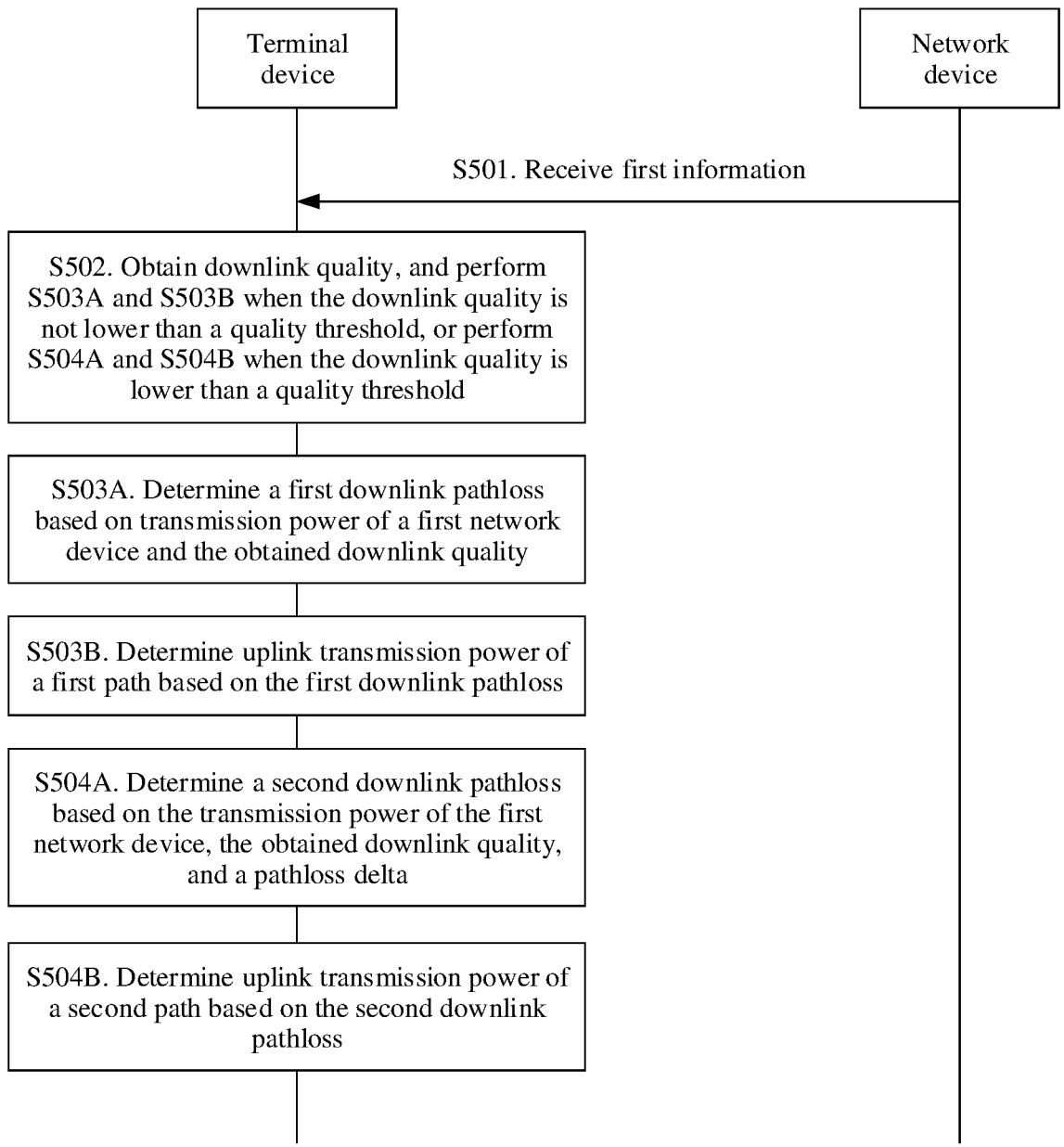
FIG. 5 is a schematic diagram of a communication process according to an embodiment of this application.

FIG. 5 is a schematic diagram of a communication process according to an embodiment of this application. The process includes the following steps.

S501. A terminal device receives first information from a first network device, where the first information includes a quality threshold and a pathloss delta.

In a cell in which a second network device is deployed, there are two communication paths between the terminal device and the network device: a communication path between the terminal device and the first network device, and a communication path between the terminal device and the second network device. In this embodiment of this application, the communication path between the terminal device and the first network device is referred to as a first path, and the communication path between the terminal device and the second network device is referred to as a second path. The "first path" and the "second path" are also applied to subsequent descriptions in this embodiment of this application, and are not described again. The first network device may perform downlink service transmission with the terminal device through the first path. The terminal device may perform uplink service transmission with the first network device or the second network device through the first path or the second path.

Downlink quality of a downlink signal received by the terminal device from the first network device is affected by a transmission distance, a transmission environment, and the like. As the distance between the terminal device and the first network device increases, the downlink quality of the downlink signal received by the terminal device from the first network device tends to decrease. For example, power, a signal to interference plus noise ratio, and the like of the downlink signal decrease. Therefore, in the cell in which the second network device is deployed, whether the terminal device is located in an uplink coverage area of the first network device or in an uplink coverage area of the second network device may be identified (determined) based on the downlink quality. The downlink quality may be a measurement value of a downlink-direction signal or channel between the terminal device and the first network device, and includes but is not limited to one or more of reference signal received power (RSRP), reference signal received quality (RSRQ), a signal to interference plus noise ratio (SINR) of a reference signal, and the like.

When a cell is the cell in which the second network device is deployed, a quality threshold ($TH_{ULonly}$) used to determine whether the terminal device is located in the uplink coverage area of the first network device or in the uplink coverage area of the second network device may be preconfigured or preset in the first network device, or the first network device may determine the quality threshold based on a corresponding algorithm. This is not limited in this embodiment of this application. For example, when the downlink quality is the RSRP, the quality threshold is an RSRP threshold; or when the downlink quality is the SINR, the quality threshold is an SINR threshold.

In addition, when a cell is the cell in which the second network device is deployed, a downlink pathloss determined by the first terminal device is a downlink pathloss of the first path. If the terminal device is located in the uplink coverage area of the second network device, determining of uplink transmit power of the second path based on a downlink pathloss of the first path causes a mismatch between the determined uplink transmit power and receive power that is required by the second network device. In this case, in this embodiment of this application, a pathloss delta may be further preconfigured or preset in the first network device, and the pathloss delta may be used to correct the downlink pathloss of the first path, to obtain a downlink pathloss of the second path.

It may be understood that the pathloss delta may also be replaced with a transmit power delta, and the transmit power delta may be determined based on the pathloss delta, for example, equal to the pathloss delta. When the terminal device is located in the uplink coverage area of the second network device, after determining uplink transmit power of the first path (or uncorrected uplink transmit power of the second path) based on the downlink pathloss of the first path, the terminal device corrects the determined uplink transmit power of the first path (or the uncorrected uplink transmit power of the second path) based on the transmit power delta. The terminal device may alternatively eliminate a difference between the downlink pathloss of the first path and the downlink pathloss of the second path, to obtain accurate uplink transmit power of the second path. The foregoing manner of obtaining the uplink transmit power of the second path based on the transmit power delta is similar to a manner of obtaining the downlink pathloss of the second path based on the pathloss delta. In the following embodiment, the pathloss delta is used as an example for description.

In an example, the first information including the quality threshold and the pathloss delta may be sent by the first network device to the terminal device through a broadcast or multicast message, a terminal device-dedicated radio resource control (RRC) message, another RRC configuration message, or MAC control element (CE) signaling.

S502. The terminal device obtains the downlink quality, and performs S503A and S503B when the downlink quality is not lower than the quality threshold, or performs S504A and S504B when the downlink quality is lower than the quality threshold.

For example, the terminal device may obtain downlink quality such as RSRP, RSRQ, and an SINR through downlink measurement. For example, the RSRP is obtained based on an average value of received signal power on all resource elements (REs) that carry a reference signal in a symbol of a downlink signal of the first network device; the RSRQ is obtained based on a ratio of the RSRP to a received signal strength indication (RSSI) of the downlink signal; and the SINR is obtained based on a ratio of strength of a wanted signal in the received downlink signal of the first network device to strength of an interference signal (noise and interference).

After the terminal device obtains the downlink quality (the downlink quality of the first path), the terminal device identifies (determines), based on the quality threshold and the obtained downlink quality, whether the terminal device is located in the uplink coverage area of the first network device or in the uplink coverage area of the second network device. When the downlink quality is not lower than the quality threshold, it indicates that the distance between the terminal device and the first network device is short, the terminal device is located in the uplink coverage area of the first network device, and the terminal device needs to perform uplink service transmission through the first path. When the downlink quality is lower than the quality threshold, it indicates that the distance between the terminal device and the first network device is long, the terminal device is located in the uplink coverage area of the second network device, and the terminal device needs to perform uplink service transmission through the second path.

In a possible implementation, the terminal device may alternatively identify (determine), based on location information of the terminal device, whether the terminal device is located in the uplink coverage area of the first network device or in the uplink coverage area of the second network device. The first information includes reference point location information (for example, location information of the first network device or location information of the second network device) and a distance threshold. The terminal device may determine, based on the location information of the terminal device, the reference point location information, and the distance threshold, whether the terminal device is located in the uplink coverage area of the first network device or in the uplink coverage area of the second network device. For example, the terminal device compares a distance between the location of the terminal device and the reference point location with the distance threshold. If the distance is less than or equal to the distance threshold, the terminal device determines that the terminal device is in an uplink coverage area of the reference point. Otherwise, the terminal device determines that the terminal device is not in the uplink coverage area of the reference point.

S503A. The terminal device determines a first downlink pathloss based on transmit power of the first network device and the downlink quality obtained by the terminal device.

When the downlink quality obtained (measured) by the terminal device is not lower than the quality threshold, it indicates that the terminal device is located in the uplink coverage area of the first network device, and the terminal device selects the first network device to perform uplink service transmission. The terminal device determines the downlink pathloss of the first path, that is, the first downlink pathloss, based on the transmit power of the first network device and the downlink quality obtained by the terminal device. For example, the terminal device may obtain the downlink pathloss of the first path based on a difference between signal strength (the transmit power of the first network device) that is for sending the downlink signal and that is carried in the downlink signal of the first network device and the RSRP obtained (measured) by the terminal device.

S503B. The terminal device determines the uplink transmit power of the first path based on the first downlink pathloss.

The terminal device compensates for first receive target power of the first network device based on the downlink pathloss of the first path, to determine the uplink transmit power of the first path. In an example, the terminal device may directly determine the uplink transmit power of the first path based on a sum of the downlink pathloss of the first path and the first receive target power. Optionally, the terminal device may alternatively determine the uplink transmit power of the first path based on the downlink pathloss of the first path and the first receive target power in a manner such as an open-loop power control policy and/or a closed-loop power control policy in uplink transmit power control. This is not limited in this embodiment of this application.

The first receive target power may be indicated or configured by the first network device for the terminal device through signaling (for example, RRC signaling, a system message, or downlink control information (DCI)).

S504A. The terminal device determines a second downlink pathloss based on the transmit power of the first network device, the downlink quality obtained by the terminal device, and the pathloss delta.

When the downlink quality obtained (measured) by the terminal device is lower than the quality threshold, it indicates that the terminal device is located in the uplink coverage area of the second network device, and the terminal device selects the second network device to perform uplink service transmission. The terminal device may correct the downlink pathloss of the first path based on the pathloss delta, to obtain the downlink pathloss of the second path (that is, the second downlink pathloss), for example, obtain the downlink pathloss of the second path based on a sum of the pathloss delta and the downlink pathloss of the first path.

S504B. The terminal device determines the uplink transmit power of the second path based on the second downlink pathloss.

In this embodiment of this application, when the first network device does not indicate second receive target power of the second network device, the terminal device may consider by default that the receive target power of the first network device is the same as the receive target power of the second network device. Optionally, the receive target power may be preamble receive target power. The terminal device compensates for the first receive target power based on the downlink pathloss of the second path, to determine the uplink transmit power of the second path. In an example, the terminal device may directly determine the uplink transmit power of the second path based on a sum of the obtained downlink pathloss of the second path and the first receive target power. Optionally, the terminal device may alternatively determine the uplink transmit power of the second path based on the downlink pathloss of the second path and the first receive target power in the manner such as the open-loop power control policy and/or the closed-loop power control policy in uplink transmit power control. This is not limited in this embodiment of this application.

In a possible implementation, to improve accuracy of determining the uplink transmit power and avoid interference to another uplink service transmission, the first information sent by the first network device to the terminal device may further include the second receive target power corresponding to the second network device. The terminal device may alternatively correct the downlink pathloss of the first path based on the pathloss delta, to obtain the downlink pathloss of the second path, and compensate for the second receive target power based on the obtained downlink pathloss of the second path, to determine the uplink transmit power of the second path.

In addition, a TA determined by the first network device is usually determined based on a transmission deviation (for example, transmission time caused by a distance) between the terminal device and the first network device. When the terminal device is located in the uplink coverage area of the second network device, because a distance between the terminal device and the second network device is less than a distance between the terminal device and the first network device, the TA determined by the first network device based on the transmission deviation between the terminal device and the first network device is not applicable to uplink service transmission between the terminal device and the second network device. To avoid that interference occurs between different uplink service transmission of the terminal device, in this embodiment of this application, when the terminal device is located in the uplink coverage area of the second network device, the terminal device further needs to determine a TA corresponding to the second network device.

In a possible implementation, the terminal device adjusts, based on a timing advance delta (TA delta), a TA sent by the first network device (a TA corresponding to the first network device), to obtain the TA corresponding to the second network device. In an example, the terminal device may determine, based on a difference between the TA corresponding to the first network device and the TA delta, the TA corresponding to the second network device. Optionally, the terminal device may adjust, based on a TA adjustment coefficient, the TA sent by the first network device, to obtain the TA corresponding to the second network device. In an example, the terminal device may determine, based on a product of the TA corresponding to the first network device and the TA adjustment coefficient, the TA corresponding to the second network device. In this embodiment of this application, the timing advance delta or the TA adjustment coefficient may be preconfigured or preset in the terminal device. Alternatively, the timing advance delta or the TA adjustment coefficient may be preconfigured or preset in the first network device, and may be sent to the terminal device through a first message, another message, or signaling.

In another possible implementation, when a cell is the cell in which the second network device is deployed, a timing advance delta or a TA adjustment coefficient used to adjust the TA corresponding to the first network device may be preconfigured or preset in the first network device. After determining the TA corresponding to the first network device, the first network device may further determine, based on the timing advance delta or the TA adjustment coefficient, the TA corresponding to the second network device. Alternatively, the first network device may send, to the terminal device, the TA corresponding to the first network device and the TA corresponding to the second network device or the timing advance delta or the TA adjustment coefficient. The terminal device selects a corresponding TA or determines a corresponding TA depending on whether the terminal device is located in the uplink coverage area of the first network device or in the uplink coverage area of the second network device. For example, the TA corresponding to the first network device and the TA corresponding to the second network device or the timing advance delta or the TA adjustment coefficient are sent to the terminal device through the first message, another message, or signaling.

After the terminal device determines the uplink transmit power and the corresponding TA, the terminal device may perform uplink service transmission based on the uplink transmit power and the corresponding TA, for example, send a random access request based on the uplink transmit power and the corresponding TA, to initiate random access. The terminal device may determine selection of a random access preamble and a random access manner (for example, two-step or four-step random access) based on the downlink pathloss of the first path. For example, when the downlink pathloss is less than a downlink pathloss threshold, the two-step random access is selected, and a random access preamble in a group B is selected; or when the downlink pathloss is not less than the downlink pathloss threshold, the four-step random access is selected, and a random access preamble in a group A is selected. When the four-step random access is selected, the random access request (a message 1 (msg1)) sent by the terminal device to the network device includes a random access preamble. When the two-step random access is selected, the random access request (a message A (msgA)) sent by the terminal device to the network device includes the random access preamble and uplink data. The uplink data may also be referred to as an uplink payload (UL payload), and may be an RRC connection setup request, an RRC re-setup request, an RRC connection recovery request, a beam recovery request, or the like. A function of the random access request is similar to that of a message 3 (msg3) in the four-step random access. Optionally, the terminal device may further receive a first maximum quantity of preamble transmission times and a second maximum quantity of preamble transmission times that are sent by the first network device. The first maximum quantity of preamble transmission times is a maximum quantity of times that the terminal device sends a preamble on the first path. The second maximum quantity of preamble transmission times is a maximum quantity of times that the terminal device sends the preamble on the second path.

When the random access of the terminal device fails, if the terminal device is preconfigured or preset with a second power ramping step corresponding to the second network device, or does not receive a second power ramping step that is corresponding to the second network device and that is sent by the first network device, the terminal device may consider by default that a first power ramping step corresponding to the first network device is equal to the second power ramping step corresponding to the second network device, and the terminal device may determine a target power ramping step based on a quantity of random access retransmission times and the first power ramping step corresponding to the first network device, adjust determined initial uplink transmit power based on the target power ramping step, and resend the random access request. That is, when the first power ramping step corresponding to the first network device is equal to the second power ramping step corresponding to the second network device, a same power ramping mechanism is used regardless of whether the terminal device is located in the uplink coverage area of the first network device or in the uplink coverage area of the second network device.

Optionally, the first network device may further send, to the terminal device, the second power ramping step or a power ramping step adjustment coefficient corresponding to the second network device. For example, the first network device sends, to the terminal device through the first message, the another message, or signaling, the first power ramping step corresponding to the first network device and the second power ramping step corresponding to the second network device, and the first power ramping step and the second power ramping step may be the same or may be different. When the terminal device determines that the terminal device is located in the uplink coverage area of the second network device, after failing to send the random access request, the terminal device performs ramping of the uplink transmit power based on the second power ramping step corresponding to the second network device, and resends the random access request based on the ramped uplink transmit power. Optionally, the second power ramping step or the power ramping step adjustment coefficient corresponding to the second network device may also be preconfigured or preset in the terminal device. For example, the terminal device may obtain the second power ramping step corresponding to the second network device through calculation based on the preconfigured power ramping step adjustment coefficient and the first power ramping step corresponding to the first network device.

It should be understood that, in this embodiment of this application, a random access preamble included in the random access request resent by the terminal device after the random access fails may be the same as or different from a random access preamble included in the random access request sent by the terminal device before the random access fails. This is not limited in this embodiment of this application.

In addition, it should be understood that determining of the uplink transmit power, the TA, and the like is described above through an example in which both the first network device and the second network device are deployed in the cell (carrier). It may be understood that technical solutions provided in this embodiment of this application may be further applicable to determining of the uplink transmit power, the TA, and the like in another scenario in which both the first network device and the second network device are deployed, for example, further applicable to determining of the uplink transmit power, the TA, and the like when both the first network device and the second network device are deployed in a beam (frequency band). For specific and related details of determining of the uplink transmit power, the TA, and the like, refer to the foregoing related details of determining of the uplink transmit power, the TA, and the like in a case in which both the first network device and the second network device are deployed in the cell. Details are not described herein again.

Embodiment 2

Figure 6:
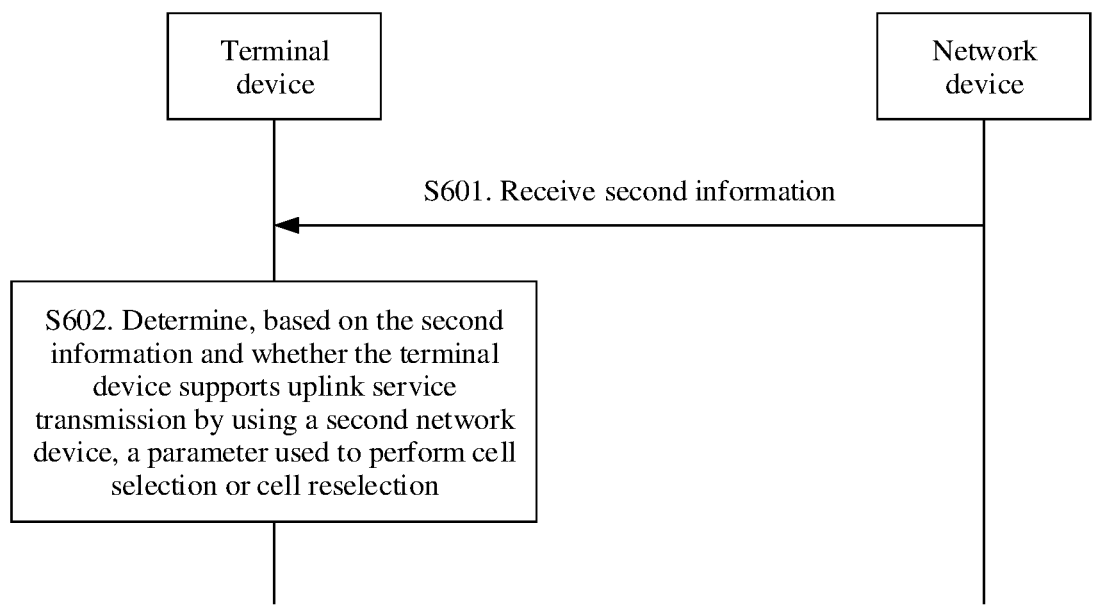
FIG. 6 is a schematic diagram of another communication process according to an embodiment of this application.

FIG. 6 is a schematic diagram of a communication process according to an embodiment of this application. The process includes the following steps.

S601. A terminal device receives second information from a first network device, where the second information includes a first parameter and a second parameter for a first cell.

The first parameter is used by a first terminal device to perform cell selection or cell reselection, the second parameter is used by a second terminal device to perform cell selection or cell reselection, the first terminal device is a terminal device that supports uplink service transmission through the first network device and a second network device, and the second terminal device is a terminal device that supports uplink service transmission only through the first network device.

Figure 7:
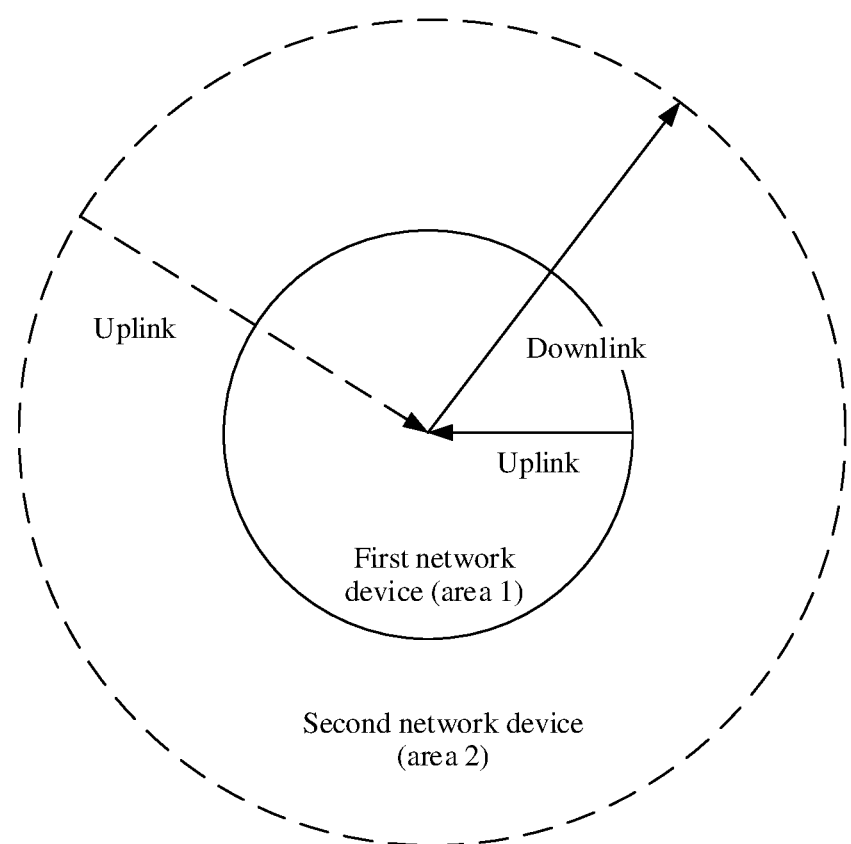
FIG. 7 is a schematic diagram of uplink and downlink coverage according to an embodiment of this application.

As shown in FIG. 2 and FIG. 7, when a cell is a cell in which the second network device is deployed, if the terminal device supports uplink service transmission through the first network device and the second network device, the terminal device is located in an uplink coverage area (area 2) of the second network device, and can normally perform uplink service transmission. However, if the terminal device supports uplink service transmission only through the first network device, the terminal device is located in the uplink coverage area (area 2) of the second network device, cannot normally perform uplink service transmission, and can normally perform uplink service transmission only in an uplink coverage area (area 1) of the first network device.

Based on this, the terminal device faces two cell selection or cell reselection scenarios depending on whether a cell (a serving cell) on which the terminal device currently camps is a cell in which the second network device is deployed.

Scenario 1: The serving cell of the terminal device is a cell in which the second network device is deployed. As shown in FIG. 7, when the terminal device supports uplink service transmission through the first network device and the second network device (that is, when the terminal device is the first terminal device), the terminal device may continue to camp on the serving cell when the terminal device is located in either the area 1 or the area 2. When the terminal device supports uplink service transmission only through the first network device (that is, when the terminal device is the second terminal device), the terminal device may continue to camp on the serving cell when the terminal device is located in the area 1, and needs to reselect another cell to camp on when the terminal device is located in the area 2.

Scenario 2: The serving cell of the terminal device is a cell in which the second network device is not deployed. Regardless of whether the terminal device supports uplink service transmission through the first network device and the second network device (that is, regardless of whether the terminal device is the first terminal device or the second terminal device), the terminal device may continue to camp on the serving cell only when the terminal device is located in the area 1.

In addition, during cell selection or cell reselection, a selection requirement for a neighboring cell is the same as that for the foregoing serving cell. For example, for a neighboring cell in which the second network device is deployed, when the terminal device supports uplink service transmission through the first network device and the second network device, the terminal device may camp on the neighboring cell when the terminal device is located in either the area 1 or the area 2 of the neighboring cell. For a neighboring cell in which the second network device is not deployed, regardless of whether the terminal device supports uplink service transmission through the first network device and the second network device, the terminal device may camp on the neighboring cell only when the terminal device is located in the area 1 of the neighboring cell.

Therefore, in this embodiment of this application, when the terminal device performs cell selection or cell reselection, impact of a cell in which the second network device is deployed (for ease of description, "a cell in which the second network device is deployed" is referred to as a first cell in the following) needs to be considered, and a parameter for performing cell selection or reselection by the terminal device needs to be optimized, to avoid affecting service transmission performance of the terminal device when the terminal device performs cell reselection too early or too late. It should be understood that the first cell may be the serving cell of the terminal device, or may be the neighboring cell of the terminal device. This is not limited in this embodiment of this application.

Optionally, it is different from a cell in which the second network device is not deployed that, the first network device sends only one parameter (for example, a minimum receive level (q-RxLevMin2)) to the terminal device, so that the terminal device performs cell selection or cell reselection. For the first cell (a cell in which the second network device is deployed), the first network device sends the second information to the terminal device, where the second information includes the first parameter used by the first terminal device to perform cell selection or cell reselection, and the second parameter used by the second terminal device to perform cell selection or cell reselection.

In a possible implementation, the first parameter is used to indicate a minimum receive level (q-RxLevMin1) required by the first cell to perform uplink service transmission on the first terminal device, and the second parameter is used to indicate the minimum receive level (q-RxLevMin2) required by the first cell to perform uplink service transmission on the second terminal device.

In another possible implementation, the first parameter is used to determine the minimum receive level (q-RxLevMin1) required by the first cell to perform uplink service transmission on the first terminal device, and the second parameter is used to determine the minimum receive level (q-RxLevMin2) required by the first cell to perform uplink service transmission on the second terminal device. In an example, the second parameter directly indicates the minimum receive level (q-RxLevMin2) required by the first cell to perform uplink service transmission on the second terminal device, and the first parameter indicates a difference (q-RxLevMinUL-offset) between the minimum receive level (q-RxLevMin1) required by the first cell to perform uplink service transmission on the first terminal device and the minimum receive level (q-RxLevMin2) required by the first cell to perform uplink service transmission on the second terminal device, and the terminal device may determine q-RxLevMin1 based on a sum of q-RxLevMin2 and q-RxLevMinUL-offset.

For example, the second network device is deployed in the serving cell, and the second network device is not deployed in a neighboring cell 1. The second information may include a first parameter and a second parameter for the serving cell, and a second parameter for the neighboring cell 1, to determine q-RxLevMin1 and q-RxLevMin2 of the serving cell and q-RxLevMin2 of the neighboring cell.

For example, the second network device is not deployed in the serving cell, and the second network device is deployed in the neighboring cell 1. In this case, the second information may include the second parameter for the serving cell, and the first parameter and the second parameter for the neighboring cell 1, to determine q-RxLevMin2 of the serving cell, and q-RxLevMin1 and q-RxLevMin2 of the neighboring cell.

For example, the second network device is deployed in both the serving cell and the neighboring cell. In this case, the second information may include the first parameter and the second parameter for the serving cell, and the first parameter and the second parameter for the neighboring cell 1, to determine q-RxLevMin1 and q-RxLevMin2 of the serving cell and q-RxLevMin1 and q-RxLevMin2 of the neighboring cell.

In an example, the first network device may send the second information to the terminal device through a broadcast or multicast message, a terminal device-dedicated RRC message, or another RRC configuration message.

S602. The terminal device determines, depending on the second information and whether the terminal device supports uplink service transmission through the second network device, the parameter used to perform cell selection or cell reselection.

Figure 8:
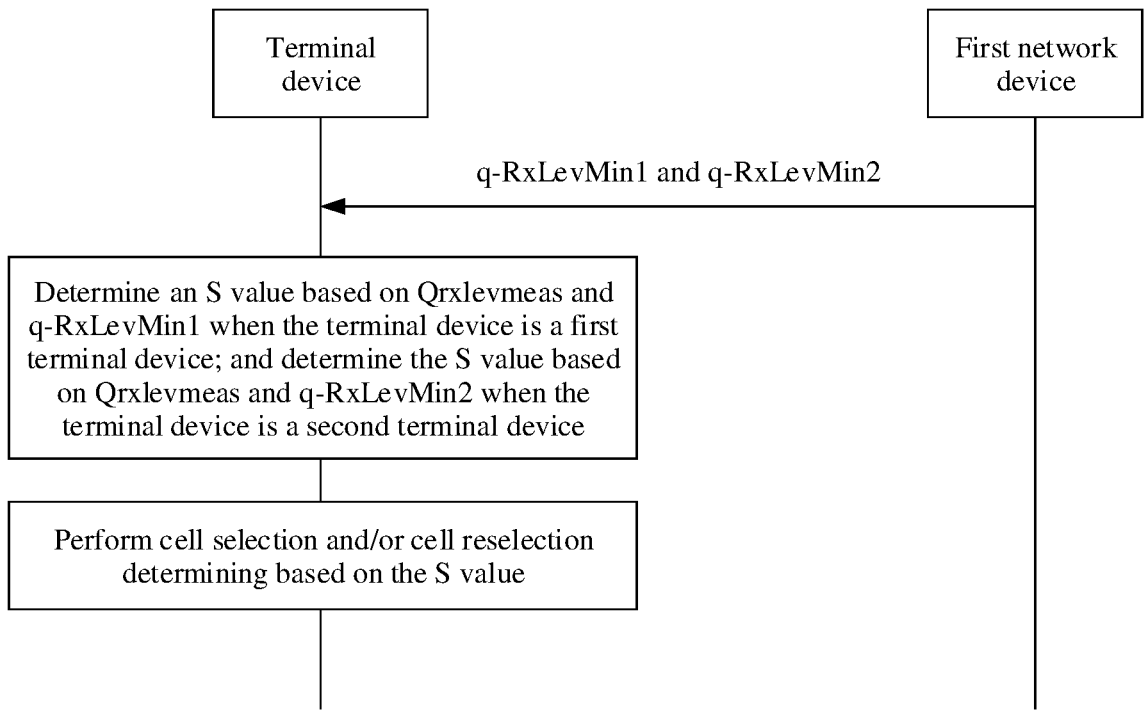
FIG. 8 is a schematic diagram of a cell selection/cell reselection process according to an embodiment of this application.

An S value (for example, a cell selection receive level value (Srxlev)) needs to be used in both cell selection and cell reselection. The S value may be determined based on a parameter such as a receive level value (Qrxlevmeas) measured by the terminal device and a minimum receive level (q-RxLevMin) required by the cell. It may be understood that the S value includes an S value of the serving cell, or an S value of the serving cell and an S value of the neighboring cell. As shown in FIG. 8, when the serving cell on which the terminal device camps is the first cell, the first network device may send a first message to the terminal device, so that the terminal device obtains q-RxLevMin1 and q-RxLevMin2. Usually, q-RxLevMin2 is greater than q-RxLevMin1. For example, the second network device is deployed in the serving cell. When the terminal device supports uplink service transmission through the first network device and the second network device (that is, when the terminal device is the first terminal device), the terminal device determines the S value of the serving cell based on Qrxlevmeas and q-RxLevMin1 of the serving cell. When the terminal device supports uplink service transmission only through the first network device (that is, when the terminal device is the second terminal device), the terminal device determines the S value of the serving cell based on Qrxlevmeas and q-RxLevMin2 of the serving cell. For determining of the S value of the neighboring cell, if the neighboring cell is a cell in which the second network device is deployed, the terminal device determines the S value of the neighboring cell based on q-RxLevMin1 (which is applicable to the first terminal device) or q-RxLevMin2 (which is applicable to the second terminal device) of the neighboring cell. If the neighboring cell is a cell in which the second network device is not deployed, the terminal device determines the S value of the neighboring cell only based on q-RxLevMin2 (which is applicable to the first terminal device and the second terminal device). Optionally, if the serving cell is a cell in which the second network device is not deployed, the terminal device determines the S value of the serving cell only based on q-RxLevMin2 (which is applicable to the first terminal device and the second terminal device) of the serving cell.

Figure 9:
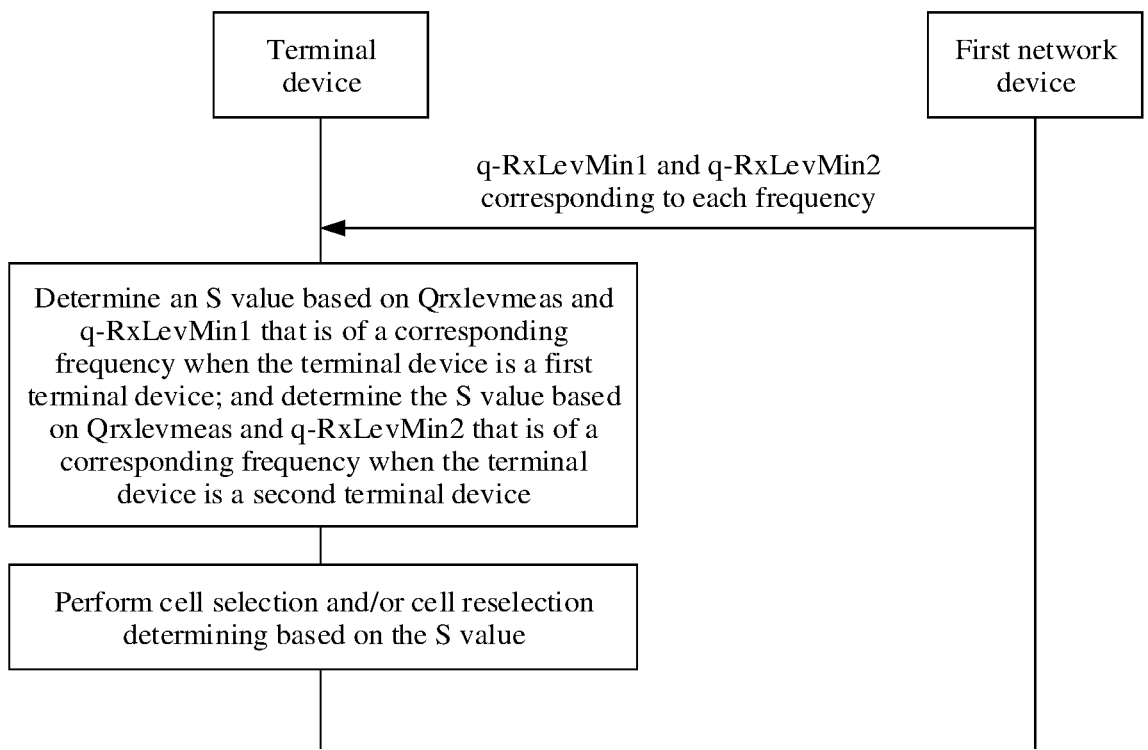
FIG. 9 is a schematic diagram of another cell selection/cell reselection process according to an embodiment of this application.

As shown in FIG. 9, when frequencies corresponding to the cell are different, corresponding q-RxLevMin1 and/or q-RxLevMin2 may be different. That is, q-RxLevMin1 and/or q-RxLevMin2 may be at a frequency level, a standard level, a cell level, a slice level, a beam level, or a synchronization signal/physical broadcast channel block (SSB)

level. In this embodiment of this application, the first network device may send, to the terminal device, q-RxLevMin1 and q-RxLevMin2 corresponding to each frequency. When determining the S value of the neighboring cell, the terminal device determines the S value based on q-RxLevMin1 and/or q-RxLevMin2 corresponding to a frequency of the neighboring cell.

Optionally, an example in which q-RxLevMin1 and/or q-RxLevMin2 are/is at the cell level is used for description. If some cells at a frequency are first cells and some are non-first cells, the first network device further needs to send a list of first cells at each frequency, a list of non-first cells, or indication information indicating whether a cell in a cell list at each frequency is the first cell. When the cell is the first cell, the terminal device that supports uplink service transmission through the first network device and the second network device selects q-RxLevMin1 to determine the S value; when the cell is the non-first cell, the terminal device selects q-RxLevMin2 to determine the S value; and the terminal device that supports uplink service transmission only through the first network device always selects q-RxLevMin2 to determine the S value.

Optionally, for a plurality of different cells at a same frequency, in consideration of different coverage requirements of the cells, downlink transmit power of the first network device may be different. In this case, different q-RxLevMin1 and/or q-RxLevMin2 may be set for different neighboring cells at a same frequency, that is, q-RxLevMin1 and/or q-RxLevMin2 are/is at the cell level. The first network device may send a cell list to the terminal device for each frequency, and each cell in the cell list is corresponding to one group of q-RxLevMin1 and/or q-RxLevMin2. If q-RxLevMin1 is carried, it indicates that the second network device is deployed in the cell. The terminal device may determine the S value based on q-RxLevMin1 and/or q-RxLevMin2 corresponding to the neighboring cell.

It may be understood that, in embodiments of this application, interaction between the first network device and the terminal device may be also applied to interaction between a CU and the terminal device or interaction between a DU and the terminal device. It may be understood that, in embodiments of this application, a mechanism of interaction between the network device and the terminal device may be appropriately transformed, to be applicable to interaction between the CU or the DU and the terminal device.

Optionally, the DU may include the first information and/or the second information in an F1 setup request message, a gNB-DU configuration update message, or a gNB-CU configuration update acknowledgment message, and send the F1 setup request message, the gNB-DU configuration update message, or the gNB-CU configuration update acknowledgment message to the CU, so that the CU and the terminal device can exchange the first information and/or the second information with reference to the foregoing embodiment or a transformation operation of the foregoing embodiment.

Optionally, the CU may include the first information and/or the second information in an F1 setup response message, a gNB-CU configuration update message, or a gNB-DU configuration update acknowledgment message, and send the F1 setup response message, the gNB-CU configuration update message, or the gNB-DU configuration update acknowledgment message to the DU, so that the DU and the terminal device can exchange the first information and/or the second information with reference to the foregoing embodiment or a transformation operation of the foregoing embodiment.

The foregoing describes, mainly from a perspective of interaction between the first network device and the terminal device, solutions provided in this application. It may be understood that to implement the foregoing functions, each network element includes a corresponding hardware structure and/or software unit (or module) for implementing each function. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 10:
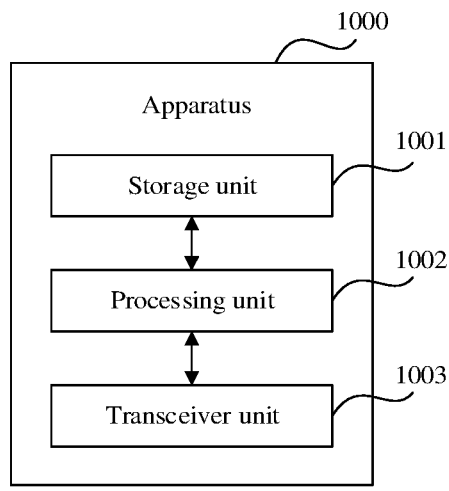
FIG. 10 is a schematic block diagram of a communication apparatus according to an embodiment of this application.

When an integrated unit (module) is used, FIG. 10 is a possible example block diagram of a communication apparatus according to an embodiment of this application. The apparatus 1000 may exist in a form of software. The apparatus 1000 may include a processing unit 1002 and a transceiver unit 1003.

In a possible design, the processing unit 1002 is configured to implement a corresponding processing function. The transceiver unit 1003 is configured to support the apparatus 1000 in communicating with another network entity. Optionally, the transceiver unit 1003 may include a receiving unit and/or a sending unit, which are respectively configured to perform a receiving operation and a sending operation. Optionally, the apparatus 1000 may further include a storage unit 1001, configured to store program code and/or data of the apparatus 1000.

The apparatus 1000 may be the terminal device in any one of the foregoing embodiments, or may be a component such as a chip disposed in the terminal device. The processing unit 1002 may support the apparatus 1000 in performing actions of the terminal device in the foregoing method examples. Alternatively, the processing unit 1002 mainly performs internal actions of the terminal device in the method examples, and the transceiver unit 1003 may support communication between the apparatus 1000 and a network device.

Specifically, in a possible embodiment, the transceiver unit 1003 is configured to receive first information from a first network device, where the first information includes a quality threshold and a pathloss delta.

The processing unit 1002 is configured to: obtain downlink quality and a downlink pathloss of a first path; and determine uplink transmit power of a second path based on the downlink pathloss and the pathloss delta when determining that the downlink quality is lower than the quality threshold, where the second path is a communication path between a terminal device and a second network device.

In a possible design, if the first information further includes second receive target power corresponding to the second network device, when determining uplink transmit power of a second path based on the downlink pathloss and the pathloss delta, the processing unit 1002 is specifically configured to determine the uplink transmit power of the second path based on the downlink pathloss, the pathloss delta, and the second receive target power.

In a possible design, the processing unit 1002 is further configured to: determine a target power ramping step based on a quantity of random access retransmission times and a second power ramping step corresponding to the second network device; and adjust the uplink transmit power based on the target power ramping step.

In a possible design, the processing unit 1002 is further configured to determine a TA corresponding to the second network device.

In another possible embodiment, the transceiver unit 1003 is configured to receive second information from a first network device, where the second information includes a first parameter and a second parameter that are for a first cell, the first parameter is used by a first terminal device to perform cell selection or cell reselection, the second parameter is used by a second terminal device to perform cell selection or cell reselection, the first terminal device is a terminal device that supports uplink service transmission through the first network device and a second network device, and the second terminal device is a terminal device that supports uplink service transmission only through the first network device.

The processing unit 1002 is configured to determine, depending on the second information and whether a terminal device supports uplink service transmission through the second network device, a parameter used to perform cell selection or cell reselection.

In a possible design, the first parameter is used to determine a minimum receive level required by the first cell to perform uplink service transmission on the first terminal device; and the second parameter is used to determine a minimum receive level required by the first cell to perform uplink service transmission on the second terminal device.

In a possible design, the first parameter is used to indicate the minimum receive level required by the first cell to perform uplink service transmission on the first terminal device; and the second parameter is used to indicate the minimum receive level required by the first cell to perform uplink service transmission on the second terminal device.

In a possible design, the first cell is a serving cell or a neighboring cell of the terminal device.

The foregoing processing unit 1002 may be implemented through a processor, the foregoing transceiver unit 1003 may be implemented through a transceiver, a communication interface, or the like, and the storage unit 1001 may be implemented through a memory.

Figure 11:
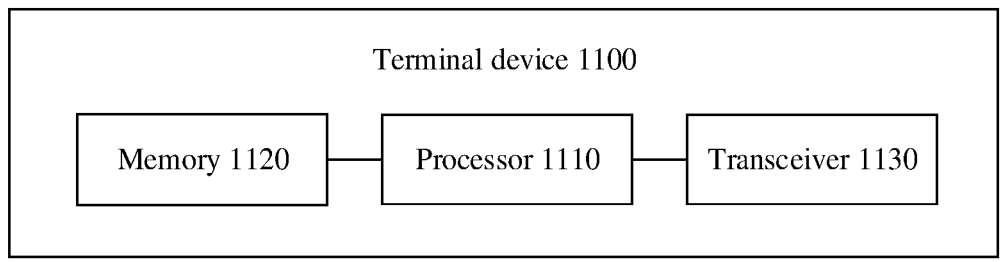
FIG. 11 is a schematic block diagram of a terminal device according to an embodiment of this application.

As shown in FIG. 11, an embodiment of this application further provides a terminal device 1100. The terminal device 1100 includes a processor 1110, a memory 1120, and a transceiver 1130.

In a possible design, the memory 1120 stores instructions, a program, or data, and the memory 1120 may be configured to implement a function of the storage unit 1001 in the foregoing embodiment. The processor 1110 is configured to read the instructions, the program, or the data stored in the memory 1120. When the instructions or the program stored in the memory 1120 is executed, the processor 1110 is configured to perform an operation performed by the processing unit 1002 in the foregoing embodiment, and the transceiver 1130 is configured to perform an operation performed by the transceiver unit 1003 in the foregoing embodiment.

It should be understood that the apparatus 1000 or the terminal device 1100 in embodiments of this application may correspond to the terminal device in the communication method (FIG. 5 or FIG. 6) in embodiments of this application, and operations and/or functions of the modules in the apparatus 1000 or the terminal device 1100 are separately used to implement corresponding procedures of the method in FIG. 5 or FIG. 6. For brevity, details are not described herein again.

Figure 12:
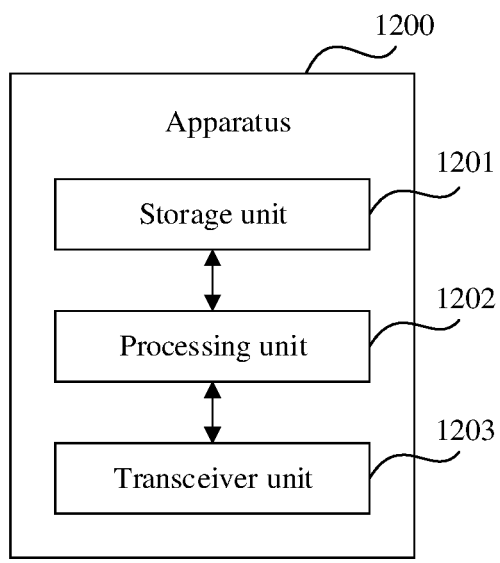
FIG. 12 is another schematic block diagram of a communication apparatus according to an embodiment of this application.

When an integrated unit (module) is used, FIG. 12 is a possible example block diagram of another communication apparatus according to an embodiment of this application. The communication apparatus 1200 may exist in a form of software. The apparatus 1200 may include a processing unit 1202 and a transceiver unit 1203.

In a possible design, the processing unit 1202 is configured to implement a corresponding processing function. The transceiver unit 1203 is configured to support the apparatus 1200 in communicating with another network entity. Optionally, the transceiver unit 1203 may include a receiving unit and/or a sending unit, which are respectively configured to perform a receiving operation and a sending operation. Optionally, the apparatus 1200 may further include a storage unit 1201, configured to store program code and/or data of the apparatus 1200.

The apparatus 1200 may be the first network device (for example, the first network device is the first network device in Embodiment 1) in any one of the foregoing embodiments, or may be a component such as a chip disposed in the first network device. The processing unit 1202 may support the apparatus 1200 in performing actions of the first network device in the foregoing method examples. Alternatively, the processing unit 1202 mainly performs internal actions of the first network device in the method examples, and the transceiver unit 1203 may support communication between the apparatus 1200 and a terminal device.

Specifically, in a possible embodiment, the transceiver unit 1203 is configured to send first information to the terminal device, where the first information includes a quality threshold and a pathloss delta.

In a possible design, the first information further includes second receive target power corresponding to a second network device.

In another possible embodiment, the transceiver unit 1203 is configured to send second information to the terminal device, where the second information includes a first parameter and a second parameter that are for a first cell, the first parameter is used by a first terminal device to perform cell selection or cell reselection, the second parameter is used by a second terminal device to perform cell selection or cell reselection, the first terminal device is a terminal device that supports uplink service transmission through the first network device and a second network device, and the second terminal device is a terminal device that supports uplink service transmission only through the first network device.

In a possible design, the first parameter is used to determine a minimum receive level required by the first cell to perform uplink service transmission on the first terminal device; and the second parameter is used to determine a minimum receive level required by the first cell to perform uplink service transmission on the second terminal device.

In a possible design, the first parameter is used to indicate the minimum receive level required by the first cell to perform uplink service transmission on the first terminal device; and the second parameter is used to indicate the minimum receive level required by the first cell to perform uplink service transmission on the second terminal device.

In a possible design, the first cell is a serving cell or a neighboring cell of the terminal device.

The foregoing processing unit 1202 may be implemented by using a processor, the foregoing transceiver unit 1203 may be implemented by using a transceiver, a communication interface, or the like, and the storage unit 1201 may be implemented by using a memory.

Figure 13:
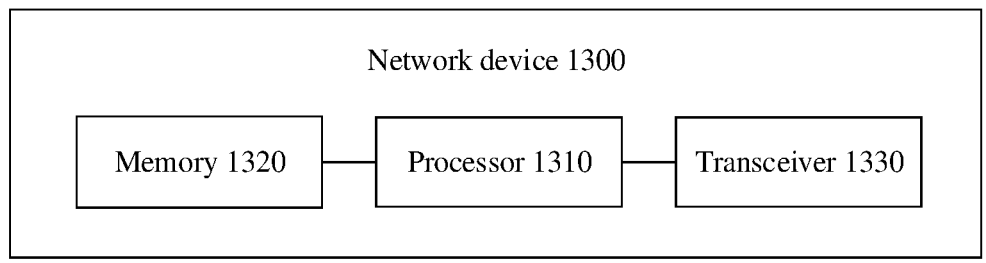
FIG. 13 is a schematic block diagram of a network device according to an embodiment of this application.

As shown in FIG. 13, an embodiment of this application further provides a network device 1300. The network device 1300 includes a processor 1310, a memory 1320, and a transceiver 1330.

In a possible design, the memory 1320 stores instructions, a program, or data, and the memory 1320 may be configured to implement a function of the storage unit 1201 in the foregoing embodiment. The processor 1310 is configured to read the instructions, the program, or the data stored in the memory 1320. When the instructions or the program stored in the memory 1320 is executed, the processor 1310 is configured to perform an operation performed by the processing unit 1202 in the foregoing embodiment, and the transceiver 1330 is configured to perform an operation performed by the transceiver unit 1203 in the foregoing embodiment.

It should be understood that the apparatus 1200 or the network device 1300 in embodiments of this application may correspond to the first network device in the communication method (FIG. 5 or FIG. 6) in embodiments of this application, and operations and/or functions of the modules in the apparatus 1200 or the network device 1300 are separately used to implement corresponding procedures of the method in FIG. 5 or FIG. 6. For brevity, details are not described herein again.

An embodiment of this application further provides a communication apparatus. The communication apparatus may be a terminal device or a circuit. The communication apparatus may be configured to perform an action performed by the terminal device in the foregoing method embodiment.

Figure 14:
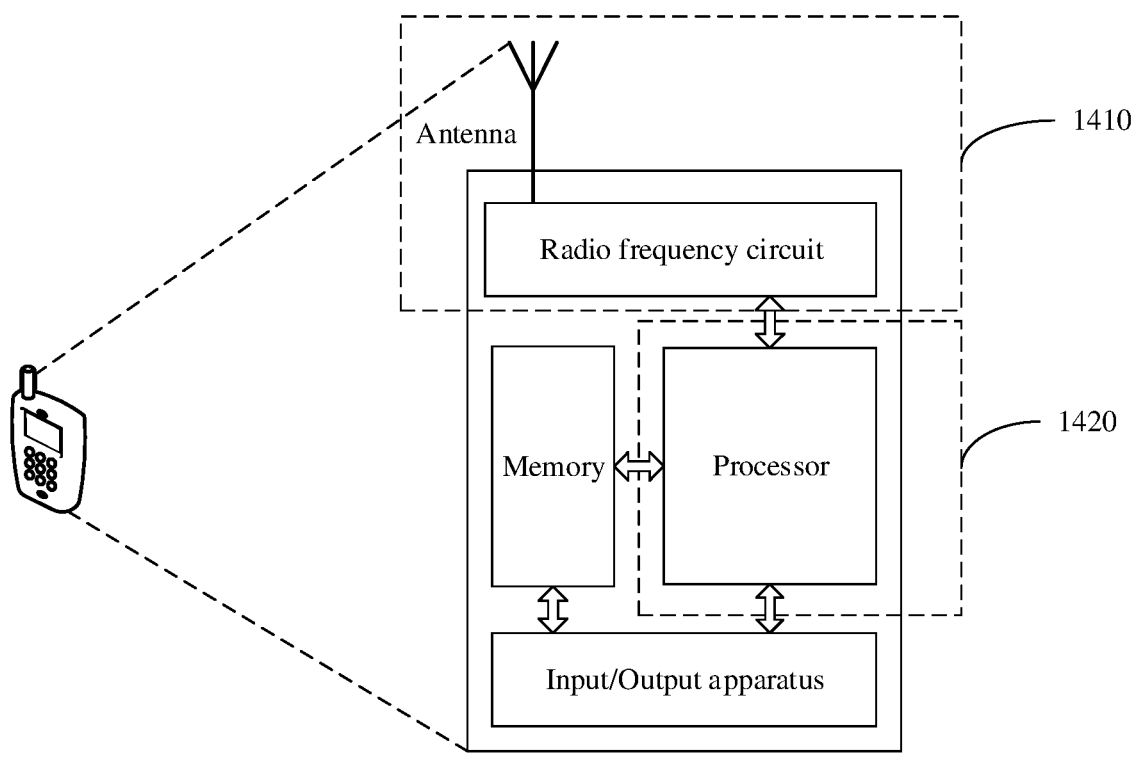
FIG. 14 is a schematic diagram of a structure of a terminal device according to an embodiment of this application.

When the communication apparatus is a terminal device, FIG. 14 is a simplified schematic diagram of a structure of the terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display screen, or a keyboard is mainly configured to: receive data entered by a user, and output data to the user. It should be noted that some types of terminal devices may not have the input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data. For ease of description, FIG. 14 shows only one memory and one processor. In an actual terminal device product, there may be one or more processors and one or more memories. The memory may also be referred to as a storage medium, a storage device, or the like. The memory may be independent of the processor, or may be integrated with the processor. This is not limited in this embodiment of this application.

In this embodiment of this application, the antenna and the radio frequency circuit that have receiving and sending functions may be considered as a transceiver unit (or a communications unit) of the terminal device, and the processor having a processing function may be considered as a processing unit of the terminal device. As shown in FIG. 14, the terminal device includes a transceiver unit 1410 and a processing unit 1420. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit sometimes may also be referred to as a transceiver, a transceiver circuit, or the like. The receiving unit sometimes may also be referred to as a receiver, a receiver, a receiver circuit, or the like. The sending unit sometimes may also be referred to as a transmitter, a transmitter circuit, or the like.

It should be understood that the transceiver unit 1410 is configured to perform a sending operation and a receiving operation on a terminal device side in the foregoing method embodiments, and the processing unit 1420 is configured to perform an operation other than the sending operation and the receiving operation of the terminal device in the foregoing method embodiments.

For example, in an implementation, the transceiver unit 1410 is configured to perform sending and receiving operations on the terminal device side in S501 in FIG. 5; and/or the transceiver unit 1410 is further configured to perform other sending and receiving steps on the terminal device side in embodiments of this application. The processing unit 1420 is configured to perform a processing operation on the terminal device side in S502 in FIG. 5; and/or the processing unit 1420 is further configured to perform other processing operation steps on the terminal device side in embodiments of this application.

In another form of this embodiment, a computer-readable storage medium is provided. The computer-readable storage medium stores instructions. When the instructions are executed, the methods on the terminal device side in the foregoing method embodiments may be performed.

In another form of this embodiment, a computer program product including instructions is provided. When the instructions are executed, the methods on the terminal device side in the foregoing method embodiments may be performed.

Figure 15:
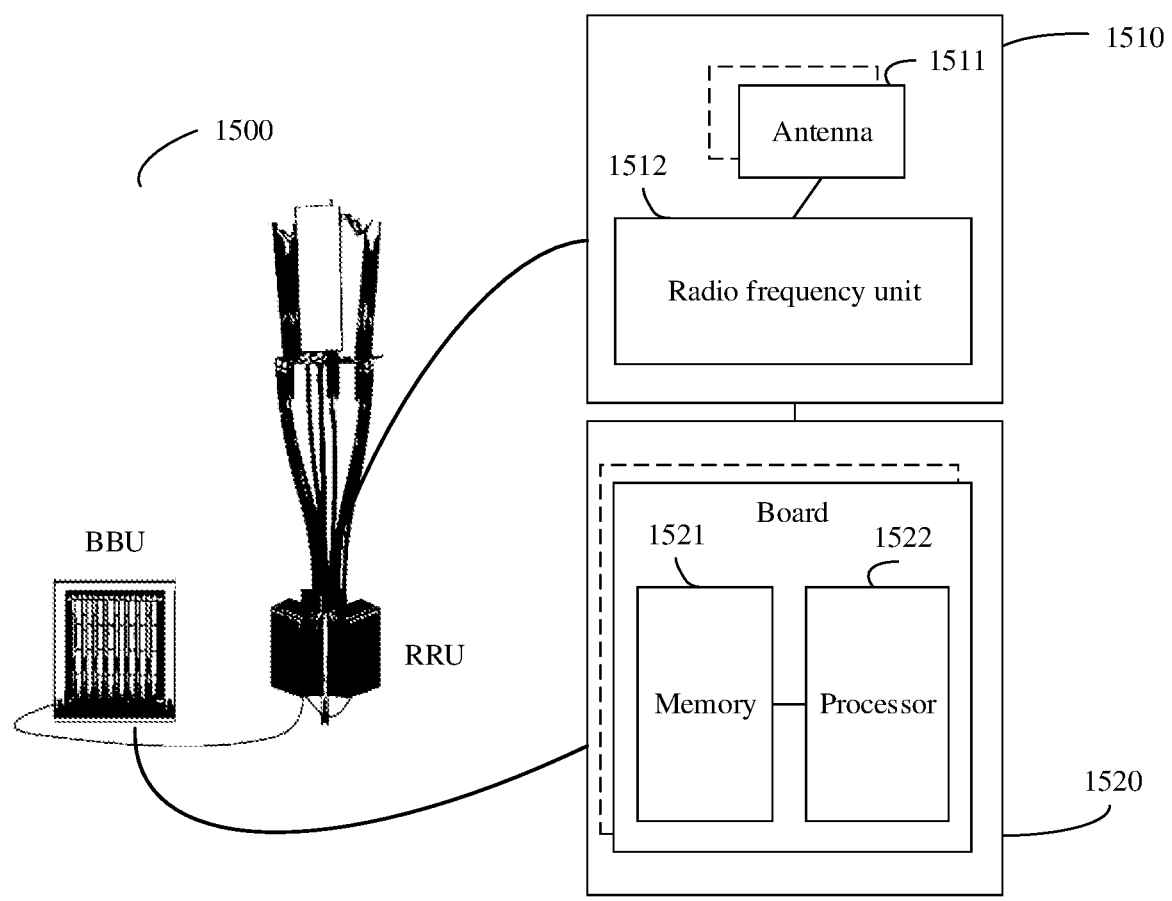
FIG. 15 is a schematic diagram of a structure of a network device according to an embodiment of this application.

When the apparatus in this embodiment is a network device, the network device may be shown in FIG. 15. An apparatus 1500 includes one or more radio frequency units, for example, a remote radio unit (RRU) 1510 and one or more baseband units (BBU) (which may also be referred to as a digital unit) 1520. The RRU 1510 may be referred to as a transceiver unit, and corresponds to the transceiver unit 1203 in FIG. 12. Optionally, the transceiver unit may also be referred to as a transceiver, a transceiver circuit, a transceiver, or the like, and may include at least one antenna 1511 and a radio frequency unit 1512. The RRU 1510 is mainly configured to: receive and send a radio frequency signal, and perform conversion between the radio frequency signal and a baseband signal. For example, the RRU is configured to send configuration information to a terminal device. The BBU 1520 is mainly configured to: perform baseband processing, control a base station, and the like. The RRU 1510 and the BBU 1520 may be physically disposed together, or may be physically separated, that is, in a distributed base station.

The BBU 1520 is a control center of the base station, and may also be referred to as a processing module. The BBU may correspond to the processing unit 1202 in FIG. 12, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1520 may include one or more boards, and a plurality of boards may jointly support a radio access network (such as an LTE network) having a single access standard, or may separately support radio access networks (such as an LTE network, a 5G network, or another network) having different access standards. The BBU 1520 further includes a memory 1521 and a processor 1522. The memory 1521 is configured to store necessary instructions and data. The processor 1522 is configured to control the base station to perform a necessary action, for example, is configured to control the base station to perform an operation procedure related to the first network device in the foregoing method embodiments. The memory 1521 and the processor 1522 may serve one or more boards. That is, the memory and the processor may be disposed individually on each board. Alternatively, a plurality of boards may share a same memory and a same processor. In addition, a necessary circuit may further be disposed on each board.

In another form of this embodiment, a computer-readable storage medium is provided. The computer-readable storage medium stores instructions. When the instructions are executed, the methods on the first network device side in the foregoing method embodiments may be performed.

In another form of this embodiment, a computer program product including instructions is provided. When the instructions are executed, the methods on the first network device side in the foregoing method embodiments may be performed.

In an implementation process, steps of the methods in embodiments may be completed by using a hardware integrated logical circuit in the processor, or by using instructions in a form of software. The steps of the methods disclosed with reference to embodiments of this application may be directly performed by a hardware processor, or may be performed by using a combination of hardware in the processor and a software module.

It should be noted that, the processor in this embodiment of this application may be an integrated circuit chip, and has a signal processing capability. In an implementation process, steps of the foregoing method embodiments may be completed by using a hardware integrated logical circuit in the processor, or by using instructions in a form of software. The processor may be a general-purpose central processing unit (CPU), a general-purpose processor, digital signal processing (DSP), an application specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external buffer. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another appropriate type.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or the instructions are loaded and executed on a computer, all or some of the procedures or functions according to embodiments of this application are implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

The steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information to the storage medium. Optionally, the storage medium may further be integrated into the processor. The processor and the storage medium may be arranged in an ASIC, and the ASIC may be arranged in a terminal device. Optionally, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of this application are described with reference to specific features, it is clear that various modifications and combinations may be made to them without departing from the scope of embodiments of this application. Correspondingly, the specification and accompanying drawings are merely example descriptions of embodiments of this application that are defined by the appended claims, and are considered to cover any or all of modifications, variations, combinations, or equivalents in the scope of embodiments of this application.

What is claimed is:

1. A method, comprising:
receiving second information from a first network device, wherein the second information comprises a first parameter and a second parameter that correspond to a first cell, the first parameter is usable by a first terminal device to perform cell selection or cell reselection, the second parameter is usable by a second terminal device to perform cell selection or cell reselection, the first terminal device supports uplink service transmission through the first network device and a second network device, and the second terminal device supports uplink service transmission only through the first network device; and
determining, based on the second information and whether a third terminal device that performs cell selection or cell reselection supports uplink service transmission through the second network device, a third parameter to use to perform cell selection or cell reselection, wherein the third terminal device is the first terminal device or the second terminal device, and the third parameter is the first parameter or the second parameter.

2. The method according to claim 1, wherein:
the first parameter is usable to determine a minimum receive level required by the first cell to perform uplink service transmission on the first terminal device; and
the second parameter is usable to determine a minimum receive level required by the first cell to perform uplink service transmission on the second terminal device.

3. The method according to claim 2, wherein the first parameter indicates the minimum receive level required by the first cell to perform uplink service transmission on the first terminal device.

4. The method according to claim 3, wherein the second parameter indicates the minimum receive level required by the first cell to perform uplink service transmission on the second terminal device.

5. The method according to claim 1, wherein the first cell is a serving cell of the third terminal device.

6. The method according to claim 1, wherein the first cell is a neighboring cell of the third terminal device.

7. A method, comprising:
sending, by a first network device, second information to a third terminal device, wherein the second information comprises a first parameter and a second parameter that correspond to a first cell, the first parameter is usable by a first terminal device to perform cell selection or cell reselection, the second parameter is usable by a second terminal device to perform cell selection or cell reselection, the first terminal device is a terminal device that supports uplink service transmission through the first network device and a second network device, and the second terminal device is a terminal device that supports uplink service transmission only through the first network device, and wherein the third terminal device is the first terminal device or the second terminal device or a different terminal.

8. The method according to claim 7, wherein the first parameter is usable to determine a minimum receive level required by the first cell to perform uplink service transmission on the first terminal device; and
wherein the second parameter is used to determine a minimum receive level required by the first cell to perform uplink service transmission on the second terminal device.

9. The method according to claim 8, wherein the first parameter indicates the minimum receive level required by the first cell to perform uplink service transmission on the first terminal device.

10. The method according to claim 9, wherein the second parameter indicates the minimum receive level required by the first cell to perform uplink service transmission on the second terminal device.

11. The method according to claim 7, wherein the first cell is a serving cell of the third terminal device.

12. The method according to claim 7, wherein the first cell is a neighboring cell of the third terminal device.

13. An apparatus, comprising:
at least one processor; and
a memory coupled with the at least one processor and comprising instructions that, when executed by the processor, cause the apparatus to:
receive second information from a first network device, wherein the second information comprises a first parameter and a second parameter that correspond to a first cell, the first parameter is usable by a first terminal device to perform cell selection or cell reselection, the second parameter is usable by a second terminal device to perform cell selection or cell reselection, the first terminal device is a terminal device that supports uplink service transmission through the first network device and a second network device, and the second terminal device is a terminal device that supports uplink service transmission only through the first network device; and determine, based on the second information and whether a third terminal device supports uplink service transmission through the second network device, a third parameter used to perform cell selection or cell reselection, wherein the third terminal device is the first terminal device or the second terminal device or a different terminal, and wherein the third parameter is the first parameter or the second parameter.

14. The apparatus according to claim 13, wherein the first parameter is usable to determine a minimum receive level required by the first cell to perform uplink service transmission on the first terminal device; and wherein the second parameter is usable to determine a minimum receive level required by the first cell to perform uplink service transmission on the second terminal device.

15. The apparatus according to claim 14, wherein the first parameter indicates the minimum receive level required by the first cell to perform uplink service transmission on the first terminal device.

16. The apparatus according to claim 15, wherein the second parameter indicates the minimum receive level required by the first cell to perform uplink service transmission on the second terminal device.

17. The apparatus according to claim 13, wherein the first cell is a serving cell of the third terminal device.

18. The apparatus according to claim 13, wherein the first cell is a neighboring cell of the third terminal device.

* * * * *